United States Patent [19]

McKay

[11] 4,188,761
[45] Feb. 19, 1980

[54] SPACER-SEALER STRIP FOR REFLECTIVE INSULATION ASSEMBLIES

[75] Inventor: Donald E. McKay, Lancaster, Ohio

[73] Assignee: Diamond Power Specialty Corporation, Lancaster, Ohio

[21] Appl. No.: 880,258

[22] Filed: Feb. 22, 1978

[51] Int. Cl.² ............................................. E04B 5/57
[52] U.S. Cl. ...................................... 52/474; 29/432; 52/800; 428/178
[58] Field of Search ........................... 52/795–800, 52/80, 351, 362, 573, 474; 428/116, 178, 182–184; 219/78.11, 78.12, 78.02, 91.2; 29/432, 526

[56] References Cited

U.S. PATENT DOCUMENTS

| | | | |
|---|---|---|---|
| 1,210,848 | 1/1917 | Scammell | 29/432 |
| 1,944,106 | 1/1934 | Ragsdale | 219/91.2 |
| 2,108,795 | 2/1938 | Budd | 52/800 |
| 2,746,139 | 5/1956 | Pappelendam | 29/526 |
| 2,926,761 | 3/1960 | Herbert | 219/78.11 |
| 3,030,703 | 4/1962 | Wirsing | 428/116 |
| 3,282,011 | 11/1966 | Meserole et al. | 52/800 |
| 3,349,525 | 10/1967 | Payne | 52/800 |
| 4,033,464 | 7/1977 | Carr | 206/493 |
| 4,086,693 | 5/1978 | Falkenberg | 29/432 |

Primary Examiner—James L. Ridgill, Jr.
Attorney, Agent, or Firm—Vytas R. Matas; Joseph M. Maguire

[57] ABSTRACT

A highly flexible spacer-sealer for reflective insulation inner assemblies is provided which spaces a pair of flexible reflective insulation sheets or liners while also sealing a volume of space therebetween. To accomplish this a corrugated strip of material is mounted on its edge between the pair of flexible reflective insulation liners all along the perimeter of the two sheets. The corrugated strip is compressed and twisted at predetermined points and mounted to one of the liners leaving the other liner to lie on the corrugated strip. This construction allows the inner assemblies to be curved and bent to conform to the various shapes of the inner and outer case assemblies which are mounted to the body to be insulated.

7 Claims, 5 Drawing Figures

U.S. Patent  Feb. 19, 1980  4,188,761
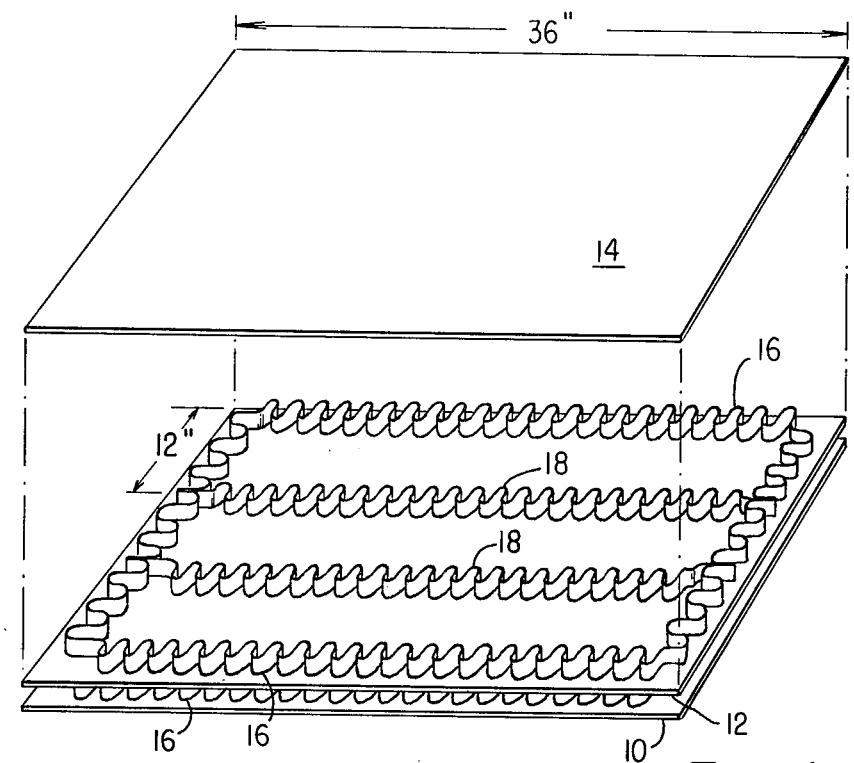
Fig. 1
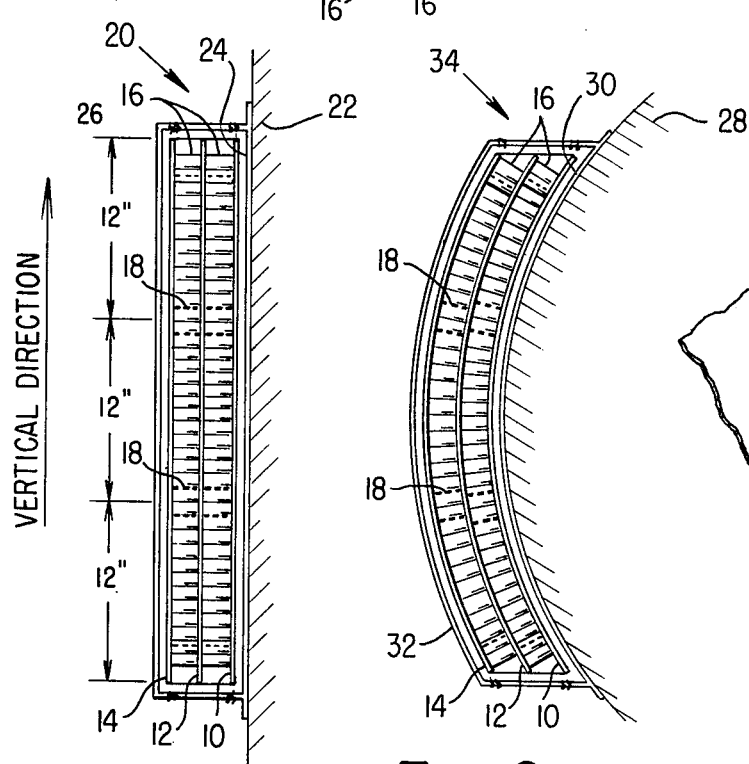
Fig. 2
Fig. 2a
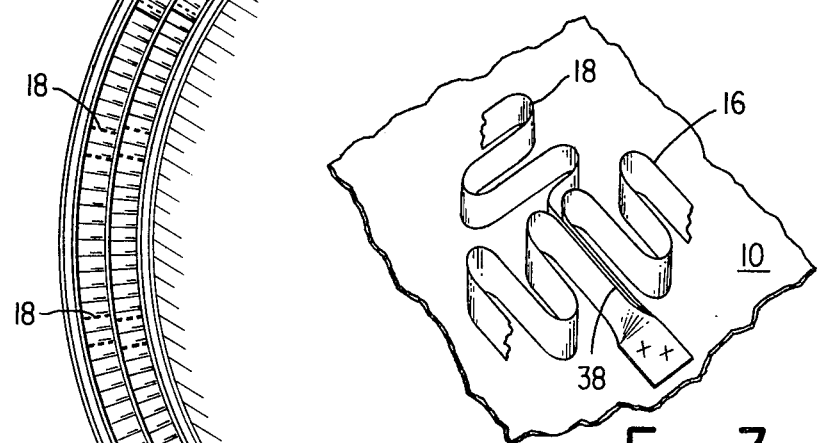
Fig. 3a
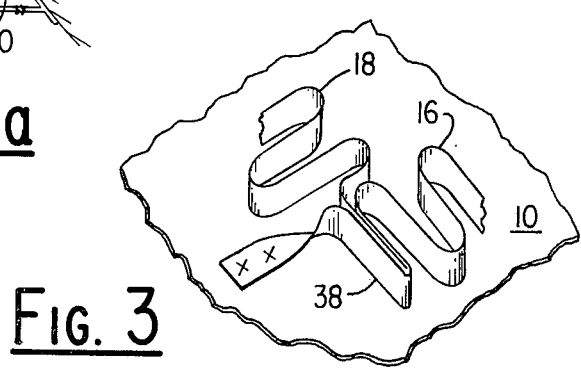
Fig. 3

SPACER-SEALER STRIP FOR REFLECTIVE INSULATION ASSEMBLIES

BACKGROUND OF THE INVENTION

1. Field of the Invention

This invention relates generally to metallic thermal insulation assemblies such as reflective insulation assemblies used in insulating nuclear reactor applications and particularly to spacer-sealer assemblies used to space and seal the individual liners of such assemblies.

2. Description of the Prior Art

Reflective insulation is used to encase the main body and associated piping of nuclear reactors to minimize heat loss therefrom. Reflective insulation is formed in spaced stacks having a plurality of thin Aluminum or Stainless Steel sheets. These spaced sheets are then encased between thicker and more structurally sound inner and outer cases. The encased stacks are custom formed to the contours of the more rigid inner and outer cases which are formed to conform to the contours of the reactor and associated piping and hence require the joining together of variously contoured encased stacks of reflective insulation of various sizes around the reactor.

Since the heat insulating ability of the stacks depends upon minimizing heat transfer by maintaining spaced zones between the reflective sheets, any compression of the stacks will press the sheets together between the spaced zones impairing the insulating efficiency of the stack. Such compression usually occurs along an edge of the stack when assemblers grab the stack by the end and squeeze together the thin sheets of reflective insulation. To prevent this a strong spacer such as a spacing clip is required to maintain the structural integrity of the stack during the various handling and assembly operations. The spacer also has to support the edge of the stack to prevent the shifting of individual sheets within the stack. Clips are known which provide such a spacing. An example of such clips may be seen in U.S. Pat. No. 4,033,464 entitled "CLIP FOR REFLECTIVE INSULATION". Such clips, however, are localized in their application and usually tie together the edges of the reflective insulation stack. In cases where an initially flat pack of flexible insulation sheets is curved around a body to be insulated a problem may occur when such clips are used. The sheets nearest the curved body to be insulated have a smaller distance to cover than the sheets furthest away. Since the edge of the pack is tied together by the end clips, the sheets nearest the insulated body will tend to corrugate while the sheets furthest from the insulated body will tend to stretch into a straight line between the edge clips since the clip prevents the sheets from overlapping. The result becomes a stack wherein spacing between sheets becomes various in thicknesses and in spots actual contact between certain sheets may occur to short circuit insulation quality.

For maximum insulation efficiency the volume between sheets must also be sealed to eliminate convective heat transfer. Prior art insulation systems used rigid closures for sealing the volumes between sheets. An example of such a closure may be found in U.S. Pat. No. 3,282,011 entitled "THERMAL INSULATION STRUCTURE". However the closure disclosed therein is rigid and thus eliminates one degree of flexibility of the insulation inner assembly since the inner assembly may not be curved along the closure.

From the foregoing it is seen that there is no prior art reflective insulation inner assembly which can simultaneously space and seal the individual sheets or liners of reflective insulation while maintaining the required flexibility of the inner assembly to allow it to be curved around a body without impairing the spacing between liners or the integrity of the seal between the same liners.

SUMMARY OF THE INVENTION

The present invention solves the problems associated with the known prior art devices as well as others by providing a combination spacer-sealer assembly for reflective insulation sheets or liner which is also highly flexible. This is accomplished by providing a corrugated strip of material mounted on its edge along the entire perimeter of a reflective insulation sheet. The corrugated strip is compressed at points along its length and twisted substantially 90° to provide a flat face which is mounted to the first sheet to keep the corrugated strip affixed to the perimeter of the sheet. A second reflective insulation sheet is then located on top of the corrugated strip of material to provide not only a continuous spacer along the entire perimeter of the two reflective insulation sheets, but also to provide a sealed volume of space between the pair of reflective insulation sheets. The corrugated aspect of the edge-mounted strip allows the pair of reflective insulation sheets to be bent in either the vertical or the horizontal plane without impairing the spacing between the sheets. The corrugated strip would merely act as an accordion bellows or a fan to expand the most at the greater radius since the strip is only tied down to one sheet.

In a specific embodiment of the present invention, the Applicant provides a reflective insulation panel assembly wherein the vertical height of the volume enclosed by the corrugated strips of material is limited to some height to minimize convective heat transfer thereby. Separate linear corrugated spacers are then parallel mounted to the first reflective insulation panels. The ends of these spacers are fitted between one bend of the main perimeter mounted corrugated strip and all three are then pressed together. This assembly of three-thick strip is twisted substantially 90° to provide a flat face mounted to the first reflective insulation sheet to mount the spacer strip and the main corrugated strip to the first sheet.

In view of the foregoing, it will be appreciated that one aspect of the present invention is to provide a combination spacer-sealer assembly for reflective insulation sheets or liners.

Another aspect of the present invention is to provide a method of mounting the spacer-sealer assembly to the sheets or liners.

These and other aspects of the present invention will become clearer after a review of the description of the preferred embodiment considered in conjunction with the accompanying drawings.

BRIEF DESCRIPTION OF THE DRAWINGS

FIG. 1 is a perspective view of three reflective insulation sheets or liners having the combination spacer-sealer assemblies mounted therebetween.

FIG. 2 is a side view of a vertically mounted reflective insulation inner assembly utilizing the spacer-sealer assembly of the present invention.

FIG. 2A shows a reflective insulation inner assembly utilizing the combination spacer-sealer assembly of the present invention mounted along a curved surface.

FIGS. 3 and 3A depict the method of mounting the combination spacer-sealer assembly of the present invention to a reflective insulation sheet or liner and simultaneously mounting a corrugated spacer and the combination spacer-sealer assembly to a reflective insulation sheet or liner.

DESCRIPTION OF THE PREFERRED EMBODIMENT

Referring now to the drawings wherein the showings are intended to depict a preferred embodiment of the present invention but not to limit the invention thereto, FIG. 1 shows a series of flexible reflective insulation sheets or liners 10, 12, 14 having a continuous strip of corrugated material 16 laid along its edge between individual sheets 10 and 12 and 12 and 14. Each liner 10, 12 and 14 is made from approximately 0.004 inch thick Stainless Steel material making each of the liners 10, 12 and 14 highly flexible and light. The liners 10, 12 and 14 are approximately 36 inches square. The main corrugated strip 16 is made from 0.003 inch thick Stainless Steel material and which is approximately 0.33 inches wide and tightly corrugated. The corrugations may be of a number of shapes including sinusoidal, harmonic, or any known repetitive geometrical shape. When the corrugated strip 16 is laid along its edge, a space of approximately ⅛ of an inch is accurately and easily maintained between adjacent liners 10 and 12 and 12 and 14. The same corrugated strip 16 not only maintains an accurate spacing between liners but also encloses a volume of space between adjacent liners bounded within the perimeter of the corrugated strip. This sealing of a volume of space prevents convective heat transfer and improves the thermal insulation qualities of any insulating assembly manufactured from such reflective insulation liners.

The Applicant knows that when an insulating assembly using such spaced and sealed liners 10, 12 and 14 is mounted in a vertical direction thermal insulating qualities are enhanced if the vertical height of the volume enclosed by the corrugated strip 16 is maintained at approximately a 12 inch height. Thus, corrugated spacers 18 may be horizontally mounted at predetermined intervals such as every 12 inches along the width of the panels or liners 10 and 12.

Turning now to FIG. 2, it will be seen that the liners such as 10, 12 and 14 spaced and sealed by the combination spacer-sealer corrugated strip 16 and 18 are mounted within a more rigid case enclosure 20 which is then mounted to a body 22 to be insulated. The enclosure 20 will usually have an inner case 24 of a thicker and more rigid material such as 0.019 inch thick Stainless Steel or Aluminum. Any number of spaced and sealed liners such as 10, 12 and 14 may be mounted within such an inner case 24 depending on the amount of insulating required. For purposes of clarity, the present enclosure 20 is shown to have only the liners 10, 12 and 14 mounted therein. The inner case 24 is covered with an outer case 26 to complete the enclosure 20 and to seal the spaced liners 12, 14 and 10 therein. It will be understood that the corrugated strip 16 and the spacers 18 need to be fastened only to one of the liners, preferably the bottom liner with the top liner being free to move along the surface of the top edge of the corrugated strip 16 and the spacer 18. Thus, liner 10 will have the corrugated strip 16 and the spacers 18 attached thereto while the liner 12 will be free to move along the corrugated strip 16 and the spacers 18. The other side of the liner 12 will have another set of corrugated strips 16 and spacers 18 mounted thereto while the liner 14 will be free to move along the top edges of the corrugated strip and spacers. The movement of the liners 12 and 14 along the tops of the affixed corrugated strips and spacers is of course limited by the sides of the inner case 24.

As may be best seen in FIG. 2, in situations where the enclosure 20 is used to insulate a body 22 along a vertical direction, the spacers 18 are mounted at approximately every 12 inches of vertical height.

The flexible nature of this type of a liner construction utilizing the sealing and spacing abilities of the edge-mounted corrugated strip 16 becomes especially useful in insulating a radial body 28. As is seen in FIG. 2A, a curved inner case 30 is made to conform to the curvature of the body 28. The initially flat liners 10, 12 and 14 are flexible and will easily conform to the curvature of the inner case 30. The corrugated strip 16 mounted to liner 10 will fan out at the top face wherein liner 12 is located. Its ability to fan out will not be impaired by liner 12 since it is not attached to the corrugated strip 16 of liner 10 but lays on the surface thereof. Similarly, the corrugated strip 16 attached to liner 12 will fan out but will not be impaired by the liner 14. Nevertheless, the spacing between liners will be uniformly maintained as well as the seal of the volume enclosed within the periphery of the corrugated strip 16 will not lose its integrity because of the compatible fit of the liners to the corrugated strip spacer sealers 16. An outer case 32 covers the inner case 30 to complete the enclosure 34.

Turning to FIGS. 3 and 3a, it will be seen that the corrugated strip 16 as well as the spacer 18 is easily mounted to a face of a liner such as 10. A portion of the corrugated strip 16 may be manipulated to provide its own means of fastening to the liner 10. As is best seen in FIG. 3, two portions of the corrugated strip 16 are squeezed together to form an overlapping area 38. This overlapping area 38 may then be bent or twisted until it is perpendicular to the rest of the corrugated strip 16 and lies in a flat plane on the liner 10. The twisted overlapping portion 38 may now be spot-welded, riveted, or stapled to the liner 10. The critical point is to provide enough length to the overlapping area 38 so as to maintain the edge of the corrugated strip 16 at a constant height. Any deformation of the wall of the corrugated strip 16 would provide a low spot through which the volume sealed between adjacent liners by the corrugated strip 16 would be free to escape and induce convective heat transfer. The corrugated strip 16 is mounted to the liner 10 at least in each corner of the perimeter and at the midpoints of each side of the perimeter. The only criteria of the number of fastening points is to provide just sufficient fastening to maintain the corrugated strip 16 along the periphery of the liner.

Clearly, the mentioned fastening method is also useful for mounting the spacers 18. As is best seen in FIG. 3 the end of the spacer 18 is fitted into a corrugation of the main corrugated strip 16. The three-thick section is then squeezed together and twisted substantially 90° to provide a flat face 38 which may now be spot-welded, riveted, or stapled to the liner 10 to retain both the corrugated strip 16 and the spacer 18 to the liner 10.

Certain modifications and improvements will occur to those skilled in the art upon reading this Specification. It will be understood that all such improvements and modifications have been deleted herein for the sake of conciseness and readability but are properly intended to be within the scope of the claims.

What I claim is:

1. A combination spacer-sealer assembly for flexible reflective insulation sheets comprising:
   a flexible first reflective insulation sheet;
   a corrugated strip of material mounted on its edge along the perimeter of said first reflective insulation sheet; and
   a flexible second reflective insulation sheet located on said corrugated strip of material to be spaced from said first sheet of reflective insulation by said corrugated strip of material and to thereby seal a volume of space between said first and second sheets of reflective insulation within the perimeter of said corrugated strip of material enclosure means maintaining said first reflective insulation sheet, said second reflective insulation sheet and said corrugated strip as an assembly; and wherein
   said corrugated strip forming its own fastening means area loosely retaining said corrugated strip of material to said first sheet of reflective insulation without impairing the integrity of the volume sealed between said first and second sheet of reflective insulation during any bending of said first and second reflective insulation sheets.

2. An assembly as set forth in claim 1 wherein said fastening means includes a section of said corrugated strip being compressed together forming a flat face and being turned with respect to the orientation of said corrugated strip to said first reflective insulation sheet to have said flat face lie along said first reflective insulation sheet.

3. An assembly as set forth in claim 2 wherein said flat face is spot-welded to said first reflective insulation sheet.

4. An assembly as set forth in claim 1 including:
   a linear strip of corrugated material mounted across the face of said first reflective insulation sheet; and wherein
   said fastening means includes a section of said corrugated strip being compressed together forming a flat face with an edge of said linear strip located therebetween and being turned to have a flat face lying along said first reflective sheet.

5. An assembly as set forth in claim 4 wherein said flat face is spot-welded to said first reflective insulation sheet.

6. An assembly as set forth in claim 4 wherein said linear strip is mounted on its edge to the face of said first reflective sheet.

7. A method of mounting a corrugated spacer-sealer assembly sheets to a sheet of reflective insulation comprising the steps of:
   locating a corrugated spacer-sealer strip on its edge to lie along the perimeter of a reflective insulation sheet;
   pressing a section of said corrugated strip together to form an overlapping compressed section lying on its edge on said reflective insulation sheet;
   twisting the end part of said overlapping compressed section substantially 90° to provide a flat section lying on the face of said reflective insulation sheet; and
   fastening said flat section to said reflective insulation sheet.

* * * * *